United States Patent
Jang et al.

(10) Patent No.: US 9,366,398 B2
(45) Date of Patent: Jun. 14, 2016

(54) BACKLIGHT UNIT AND LIQUID CRYSTAL DISPLAY APPARATUS HAVING THE SAME

(71) Applicant: SAMSUNG ELECTRONICS CO., LTD., Suwon-si (KR)

(72) Inventors: Na-won Jang, Seongnam-si (KR); Kun-ho Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 14/217,880

(22) Filed: Mar. 18, 2014

(65) Prior Publication Data

US 2015/0055058 A1 Feb. 26, 2015

(30) Foreign Application Priority Data

Aug. 23, 2013 (KR) ........................ 10-2013-0100516

(51) Int. Cl.
*G02F 1/1335* (2006.01)
*F21K 99/00* (2016.01)
*F21V 8/00* (2006.01)

(52) U.S. Cl.
CPC ................ *F21K 9/56* (2013.01); *G02B 6/0026* (2013.01); *G02F 1/133603* (2013.01); *G02F 1/133609* (2013.01); *G02F 1/133615* (2013.01); *G02F 2001/133614* (2013.01); *G02F 2202/108* (2013.01); *G02F 2203/055* (2013.01)

(58) Field of Classification Search
CPC ......................... G02F 1/133615; G02B 6/0073
USPC ....................................... 349/65; 362/612, 602
See application file for complete search history.

(56) References Cited

U.S. PATENT DOCUMENTS

| 8,164,704 B2 * | 4/2012 | Kim .................... G02F 1/13454 349/161 |
| 2010/0033947 A1 | 2/2010 | Lin et al. |

FOREIGN PATENT DOCUMENTS

| EP | 2 068 193 A2 | 6/2009 |
| WO | 2006/007302 A1 | 1/2006 |

OTHER PUBLICATIONS

Communication dated Sep. 2, 2014 issued by the European Patent Office in counterpart European Patent Application No. 14170546.7.

* cited by examiner

*Primary Examiner* — Thanh-Nhan P Nguyen
(74) *Attorney, Agent, or Firm* — Sughrue Mion, PLLC (57) ABSTRACT

A backlight unit (BLU) and a liquid crystal display apparatus having the BLU are provided. The BLU includes a plurality of light-emitting diodes (LEDs) configured to emit blue light, a fluorescent member configured to convert the blue light emitted from the plurality of LEDs into tricolor light and emit the tricolor light, and a filter disposed between the fluorescent member and the plurality of LEDs, and configured to selectively filter a first wavelength area of the tricolor light emitted from the fluorescent member toward the plurality of LEDs, and reflect a second wavelength area of the tricolor light emitted from the fluorescent member toward an output direction.

11 Claims, 6 Drawing Sheets

BACKLIGHT UNIT AND LIQUID CRYSTAL DISPLAY APPARATUS HAVING THE SAME

CROSS-REFERENCE TO RELATED APPLICATION

This application claims priority from Korean Patent Application No. 10-2013-0100516, filed on Aug. 23, 2013 in the Korean Intellectual Property Office, the disclosure of which is incorporated herein by reference in its entirety.

BACKGROUND

1. Field

Apparatuses and methods consistent with exemplary embodiments relate to providing a backlight unit (BLU) and a liquid crystal display apparatus having the same, and more particularly, to providing a BLU that uses a quantum dot member as a fluorescent body, and a liquid crystal display apparatus having the same.

2. Description of the Related Art

A liquid crystal display (LCD) apparatus is an apparatus that realizes an image by using a liquid crystal and is implements as various types of display apparatuses such as a television (TV), a computer monitor, a smartphone display, a tablet, a smart wrist watch display, a smart glass display, etc.

A liquid crystal display apparatus may include a liquid crystal panel that displays light as an image and a light-emitting unit that provides light to the liquid crystal panel. The light-emitting unit may be referred to as a backlight unit (BLU).

A mercury discharge lamp such as an exterior electrode fluorescent lamp (EEFL), a cold cathode fluorescent lamp (CCFL), or the like may be used as the light-emitting unit. Alternatively, a light-emitting diode (LED) that may be capable of improving color reproduction without using silver (Ag) has been used as the light-emitting unit as well.

The light-emitting unit may be classified into a side light type and a direct type according to a position of a light source. The side light type refracts light from the light source, which is disposed on a side of the liquid crystal panel, to a light guide panel (LGP) which in turn provides the refracted light to the liquid crystal panel. The direct type provides light through a plurality of light sources that are disposed on a back side of the liquid crystal panel.

In the side light type light-emitting unit, the light emitted from the light source is guided such that the light is incident through the LGP and then is surface-emitted through total reflection and diffused reflection from select points in the LGP. The light surface-emitted from the LGP may be diffused and concentrated by optical sheets disposed on an upper side of the LGP, for example, by a diffuser sheet, a prism sheet, and a dual brightness enhancement film (DBE). Then the light is incident onto the liquid crystal panel.

The light-emitting unit may include a blue chip and/or other fluorescent bodies (red, green, yellow, white, etc.). The color representation ranges of the general fluorescent bodies may be limited. Thus, given that full width half maximums (FWHMs) of red light and green light are wide and may therefore affect other colors. Accordingly, the red light and the green light may not realize high color purities and color representations.

Figure 1:
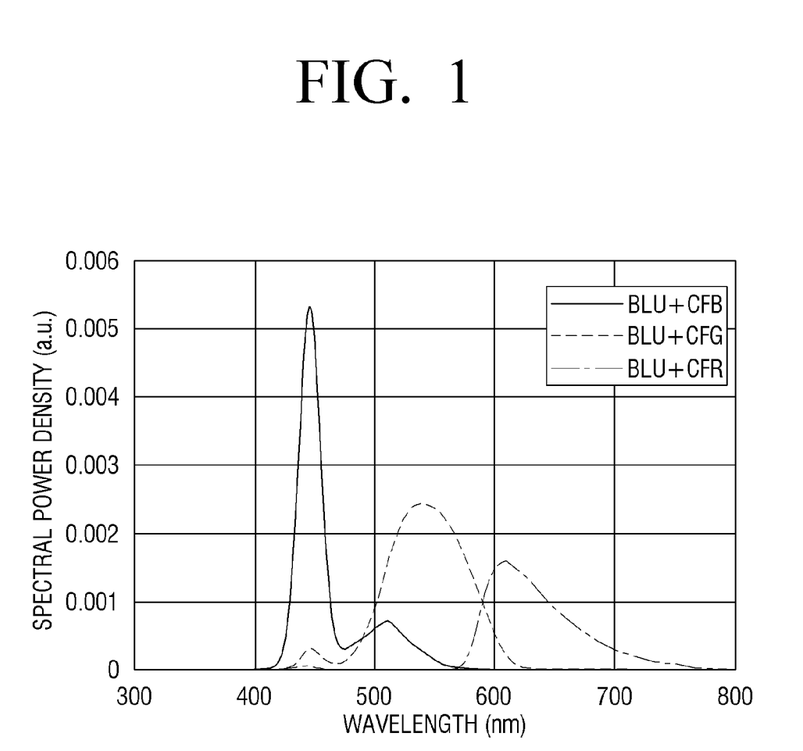
FIG. 1 is a graph illustrating a spectral power density of a liquid crystal display apparatus.

Also, although the light emitted from the light-emitting unit may be passed through a color filter, a sharp peak wavelength may still appear as shown in FIG. 1, and thus color representation may be lowered.

A light-emitting unit that uses a quantum dot member that has received attention as a fluorescent body that may improves light efficiency. However, a fluorescent characteristic of the quantum dot member is deteriorated due to heat discharged from a light source, and a lifespan of a produce is reduced.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a backlight unit (BLU) including a film that is disposed on a side of a quantum dot member to pass a short wavelength and reflect a long wavelength so as to improve color purity and color representation of a liquid crystal panel, improve light efficiency, and optimize a temperature, and a liquid crystal display apparatus having the same.

According to an aspect of an exemplary embodiment, there is provided a backlight unit (BLU) including a plurality of light-emitting diodes (LEDs) configured to emit blue light, a fluorescent member configured to convert the blue light emitted from the plurality of LEDs into tricolor light and emit the tricolor light, and a filter disposed between the fluorescent member and the plurality of LEDs, and configured to selectively filter a first wavelength area of the tricolor light emitted from the fluorescent member toward the plurality of LEDs, and reflect a second wavelength area of the tricolor light emitted from the fluorescent member toward an output direction.

The fluorescent member may be a quantum dot member.

The filter may be further configured to transmit a short wavelength of the tricolor light emitted from the fluorescent member toward the plurality of LEDs and reflect a long wavelength of the tricolor light toward the output direction.

The short wavelength may include a blue light area and an ultraviolet light area, and the long wavelength may include a red light area, a green light area, and an infrared light area.

The fluorescent member may be further configured to maintain a preset optical distance from the plurality of LEDs.

According to an aspect of another exemplary embodiment, there is provided a liquid crystal display apparatus including a liquid crystal panel, a plurality of optical sheets configured to be disposed underneath the liquid crystal panel, and a plurality of BLUs each including a plurality of light-emitting diodes (LEDs) configured to emit blue light, a fluorescent member that converts the blue light emitted from the plurality of LEDs into tricolor light and emits the tricolor light, and a filter disposed between the fluorescent member and the plurality of LEDs, and configured to selectively filter a first wavelength area of the tricolor light emitted from the fluorescent member toward the plurality of LEDs, and reflect a second wavelength area of the tricolor light emitted from the fluorescent member toward an output direction.

The fluorescent member may be a quantum dot member, and wherein the filter may be further configured to transmit blue light and ultraviolet light of a short wavelength area and reflect red light, green light, and infrared light of a long wavelength area.

The plurality of BLUs may be disposed at intervals opposite a lower surface of the liquid crystal panel.

The liquid crystal display apparatus may further include a light guide panel (LGP) disposed underneath the plurality of optical sheets, wherein the plurality of BLUs may be disposed along sides of the LGP.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail because they would obscure the exemplary embodiments with unnecessary detail.

Figure 2:
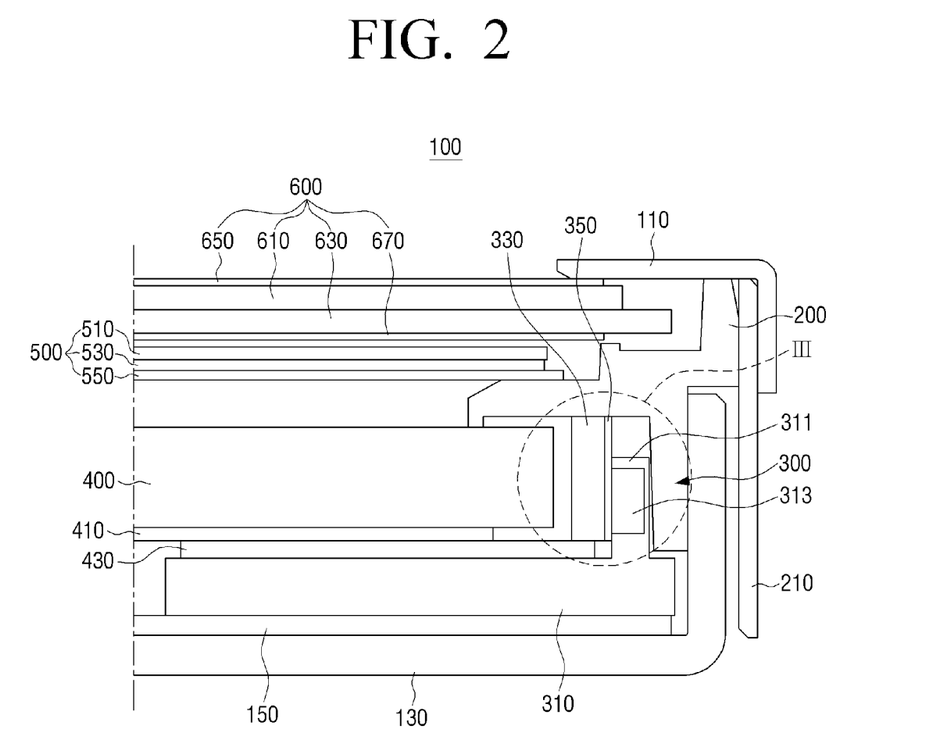
FIG. 2 is a schematic cross-sectional view illustrating a liquid crystal display apparatus according to an exemplary embodiment.

Referring to FIG. 2, a liquid crystal display apparatus 100, according to an exemplary embodiment includes a top chassis 110 that is formed on an uppermost part, a bottom chassis 130 that houses various types of parts, an intermediate mold member 200 that is included between the top chassis 110 and the bottom chassis 130, a side wall chassis 210, a side light type backlight unit (BLU) 300, a light guide panel (LGP) 400, a plurality of optical sheets 500, and a liquid crystal panel 600.

The bottom chassis 130 may be formed of a metallic material or a high strength synthetic resin so as to maintain rigidity of the liquid crystal display apparatus 100.

The intermediate mold member 200 supports some parts of the liquid crystal display apparatus 100 along with the top chassis 110 and the bottom chassis 130. For this purpose, the intermediate mold member 200 is disposed along an edge area of the liquid crystal display apparatus 100 and between the top chassis 110 and the bottom chassis 130.

The side light type BLU 300 includes a printed circuit board (PCB) 310 that drives light-emitting diodes (LEDs), a plurality of LEDs 313 that are mounted on the PCB 310 and emit blue light, a quantum dot member 330 that is a fluorescent member, and a filter 350 that filters a particular wavelength or range of wavelengths.

The PCB 310 may be formed of a metallic material having high heat conductivity to operate as a heat sink so as to absorb high temperature heat generated when driving the plurality of LEDs 313.

The PCB 310 may be fixedly adhered onto an internal surface of the bottom chassis 130 through a double-sided adhesive tape 150. In this case, the double-sided adhesive tap 150 may be formed of a graphite material having a high heat emission characteristic to effectively transmit heat emitted from the PCB 310 to the bottom chassis 130.

The PCB 310 includes an extending part 311 which protrudes from a side of the PCB 310 and at which the plurality of LEDs 313 are respectively installed along the side of the extending part 311. The extending part 311 sets positions of the plurality of LEDs 313 so that the plurality of LEDs 313 emit light along respective sides of the LGP 400.

The plurality of LEDS 313 may be disposed at predetermined intervals along the respective sides of the LGP 400. The plurality of LEDs 313 may be LEDs that emit blue light corresponding to a short wavelength.

The quantum dot member 330 may be composed of a nano material that generates light having a short wavelength when particles within the quantum dot member 330 are small and generates light having a long wavelength when the particles within the quantum dot member 330 are large. Accordingly, sizes of the particles of the quantum dot member 330 may be adjusted so as to emit light of a particular or a variety of visible light areas. The quantum dot member 330 may realize natural colors depending on a material thereof and may control a wavelength of light. Therefore, the quantum dot member 330 may have a high color representation rate and may emit highly bright light.

The quantum dot member 330 may be designed in the form of a bar shape having an length that allows the quantum dot member 300 to be disposed along and in arrangement directions of a plurality of light sources in order to correspond to the plurality of light sources. The quantum dot member 330 may specifically be formed of a mixture of a red quantum dot and a green quantum dot. Therefore, if blue light having a short wavelength is incident from the plurality of LEDs 313, a white color may be realized due to the red, green, and blue colors provided through the quantum dot member 330.

Figure 3:
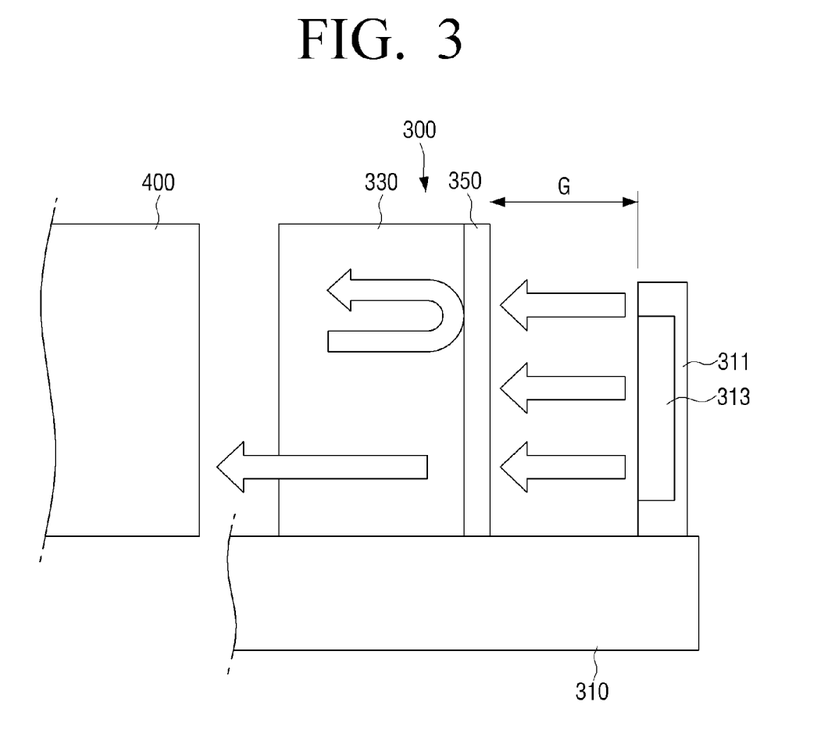
FIG. 3 is a schematic enlarged view illustrating part III of FIG. 2 according to an exemplary embodiment.

The quantum dot member 330 may be disposed to keep a preset optical distance G (refer to FIG. 3) from the plurality of LEDs 313. FIG. 3 is a view with a slightly exaggerated illustration of the optical distance G. Accordingly, alternate exemplary embodiments could be envisioned wherein the optical distance G is proportionally narrower between the quantum dot member 330 and the plurality of LEDs 313.

The filter 350 is laminated along a side opposite the quantum dot member 330, for example, along a surface facing the plurality of LEDs 313.

Figure 4:
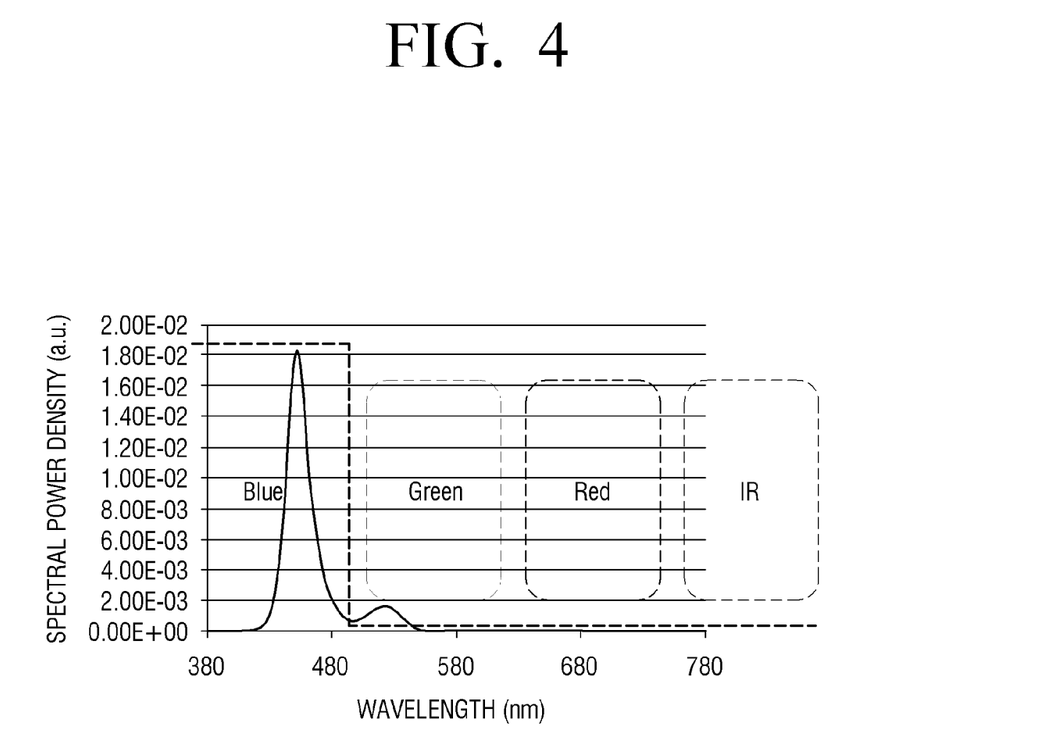
FIG. 4 is a graph illustrating a short wavelength that is transmitted from a quantum dot member toward a light source when a filter similar to the one shown in FIG. 3 is used according to an exemplary embodiment.

The filter 350 has a filtering characteristic that transmits only a short wavelength of light (blue light) and ultraviolet light and reflects a long wavelength (red light and green light) and infrared light as shown in FIG. 4.

In other words, as shown in FIG. 3, short-wavelength blue light emitted from the plurality of LEDs 313 passes through the filter 350, is incident onto the quantum dot member 330, and scattered and reflected in the quantum dot member 330 to be emitted as white light.

A portion of the white light is emitted toward the LGP 400, and the other portion of the white light is emitted toward the plurality of LEDs 313. In this case, white light emitted from the quantum dot member 330 toward the LGP 400 is emitted toward a wide surface of the LGP 400 (a surface facing the liquid crystal panel 600) through total reflection and diffused reflection.

White light that is emitted from the quantum dot member 330 toward the plurality of LEDs 313 is scattered or absorbed in the quantum dot member 330. Here, only a short wavelength (blue light) and ultraviolet light of scattered or absorbed light passes through the filter 350, and a long wavelength area (red light, green light, or red light) of the scattered or absorbed light is reflected from the filter 350 to be re-reflected toward the LGP 400.

Figure 5:
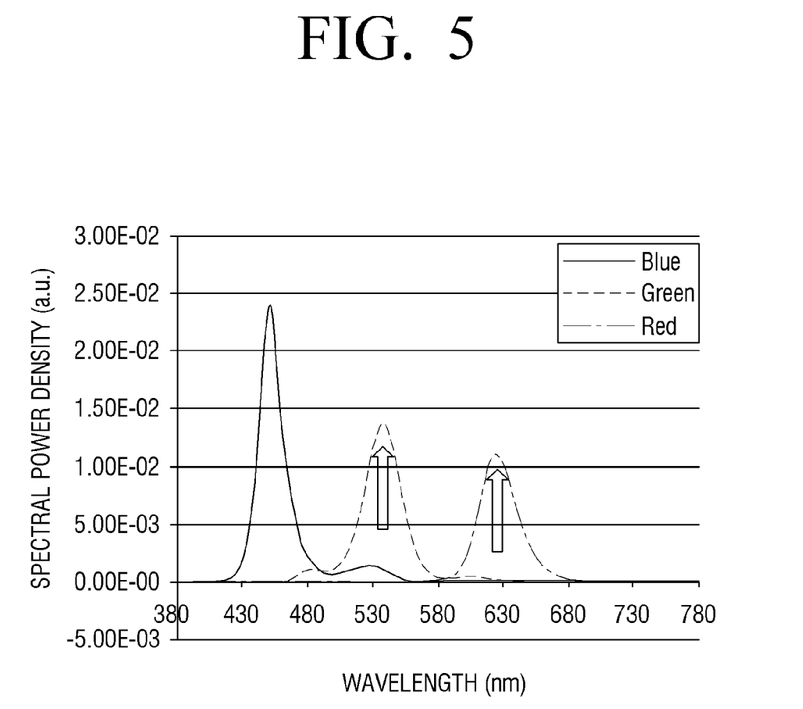
FIG. 5 is a graph illustrating spectral power density of a liquid crystal display apparatus according to an exemplary embodiment.

Therefore, because amounts of red light and green light that affect brightness on the LGP 400 increase (refer to FIG. 5), total light efficiency is greatly improved, and color purity and color representation increases. Infrared light affecting a temperature is diffused from the quantum dot member 330 to the LGP 400 that is a wide area, and thus a surface temperature of the quantum dot member 330 decreases. Therefore, the side light type BLU 300 using the quantum dot member 330 that is vulnerable to heat may be improved.

Respective parts of the side light type BLU 300 that are separated from one another but may be manufactured as a single package. If the side light type BLU 300 is manufactured as the single package as described above, the quantum dot member 330 may be fixed to the PCB 310 through a predetermined molding member.

The LGP 400 includes a reflector sheet 410 that is disposed underneath the LGP 400, to prevent light loss through a lower part of the LGP 400. In this case, the LGP 400 may further include an additional reflector sheet 430 that adheres to an edge of the reflector sheet 410, in order to prevent light loss along an edge of a lower part of the LGP 400. In this case, an adhesive may be coated on front/back surfaces of the additional reflector sheet 430 so that the additional reflector sheet 430 operates as a double-sided tape, in order to totally fix the LGP 400 to the side light type BLU 300.

The plurality of optical sheets 500 may include a diffuser sheet 510 that is disposed on top of the LGP 400 and diffuses scattered light emitted from the LGP 400. A prism sheet 530 and a dual brightness enhancement film (DBEF) sheet 550 may be sequentially disposed between the diffuser sheet 510 and the LGP 400 to enhance light brightness.

The liquid crystal panel 600 is disposed on the plurality of optical sheets 500 oriented such that the liquid crystal panel 600 faces the DBEF sheet 550. The liquid crystal panel 600 may include an array substrate 630, a color filter substrate 610 that faces the array substrate 630, and a liquid crystal layer that is interposed in a sealed state between the array substrate 630 and the color filter substrate 610. A size of the color filter substrate 610 may be smaller than that of the array substrate 630. Therefore, an area that is not covered by the color filter substrate 610 may be exposed. A pad part may be formed in the exposed edge area.

The array substrate 630 may be a substrate that includes thin film transistors (TFTs) that are switching devices that are formed in a matrix. A data line and a gate line are respectively connected to source terminals and gate terminals of the TFTs, and pixel electrodes formed of transparent conductive materials are connected to drain terminals of the TFTs. A data pad part that extends from the data line is disposed in a non-display area of the array substrate 630. A gate pad that extends from the gate line may be further disposed.

The color filter substrate 610 is a substrate that faces the array substrate 630 and where RGB pixels for realizing colors are formed in a thin film shape. A common electrode is formed of a transparent conductive material on the color filter substrate 610 to face the pixel electrodes formed on the array substrate 630.

The liquid crystal panel 600 may include an array substrate on which a color filter is formed and a counter substrate which faces the array substrate and on which a common electrode is formed.

If power is applied to the gate terminals of the TFTs, and thus the TFTs are turned on, an electric field may be formed between the pixel electrodes and the common electrode. A liquid crystal arrangement of the liquid crystal layer disposed between the array substrate 630 and the color filter substrate 610 may be changed by the electric field. Also, light transmittance may be changed according to the change of the liquid crystal arrangement, and thus a desired gradation image may be displayed.

The liquid crystal panel 600 may further include a first polarizer film 670 that is disposed underneath the array substrate 630 and a second polarizer film 650 that is disposed on the color filter substrate 610. The first polarizer film 670 may include a transmission axis of a first direction and may polarize light in the first direction. The second polarizer film 650 may include a transmission axis of a second axis and may polarize light in the second direction. For example, the transmission axis of the first polarizer film 670 and the transmission axis of the second polarizer film 650 may be perpendicular to each other.

Figure 6:
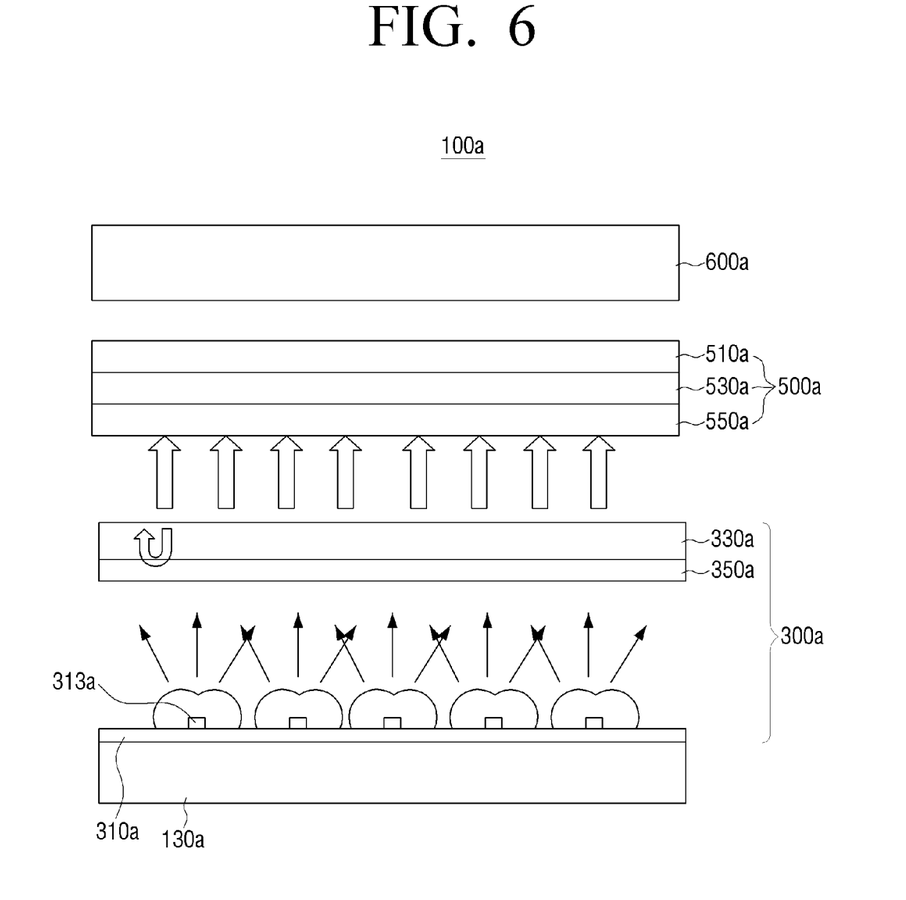
FIG. 6 is a cross-sectional view illustrating a liquid crystal display apparatus according to another exemplary embodiment.

As shown in FIG. 6, a liquid crystal display apparatus 100a according to another exemplary embodiment may have a similar structure to the liquid crystal display apparatus 100 of the previous exemplary embodiment but is different from the liquid crystal display apparatus 100 in that a BLU 300a is a direct type. Therefore, detailed descriptions of the same elements of the liquid crystal display apparatus 100a as those of the liquid crystal display apparatus 100 are omitted, and a structure of the direct type BLU 300a will be mainly described.

For convenience of description, illustrations of a top chassis and an intermediate mold member of the liquid crystal display apparatus 100a of the present exemplary embodiment shown in FIG. 6 are omitted.

In the liquid crystal display apparatus 100a of the present exemplary embodiment, the direct type BLU 300a is fixedly disposed on an internal side of a bottom chassis 130a. Also, a plurality of optical sheets 500a including a diffuser sheet 510a, a prism sheet 530a, and a DBEF sheet 550a may be disposed above the internal side of the bottom chassis 130a, and a liquid crystal panel 600a may be disposed on the plurality of optical sheets 500a.

Similar to the side light type BLU 300, the direct type BLU 300a includes a PCB 310a that drives LEDs, a plurality of LEDs 313a that are mounted on the PCB 310a, a quantum dot member 330a that is a fluorescent member, and a filter 350a that filters a particular wavelength.

The plurality of LEDS 313a that emit blue light are mounted on a side of the PCB 310a facing the diffuser sheet 510a. A plurality of PCBs 310a may be disposed on the bottom chassis 130a at intervals so as to correspond to a size of the liquid crystal panel 600a.

A plurality of quantum dot members 330a are formed in bar shapes having approximately predetermined lengths and disposed such that the quantum dot members 330a correspond to the PCBs 310a. The quantum dot members 330a, according to the present exemplary embodiment, may also be disposed to keep a preset optical distance from the plurality of LEDs 313a.

The filter 350a is laminated along an opposite side from the quantum dot member 330a, i.e., along a surface facing the plurality of LEDs 313a. Like the filter 350 of the previous exemplary embodiment, the filter 350a may have a filtering characteristic that transmits only a short wavelength (blue light) of light and ultraviolet light and reflects infrared light.

In the present exemplary embodiment, blue light of short wavelength emitted from the plurality of LEDs 313a may pass through the filter 350a, thereby being incident onto the quantum dot member 330a, and at which point the blue light of short wavelength may be scattered and reflected in the quantum dot member 330a thereby being emitted as white light.

A portion of the white light is emitted toward the plurality of optical sheets 500a, and the other portion of the white light is emitted toward the plurality of LEDs 313a. In this case, white light emitted toward the plurality of LEDs 313a that is in the direction of the light source is scattered or absorbed in the quantum dot member 330a. Further, only a short wavelength (blue light) and ultraviolet light of the scattered or absorbed light passes through the filter 350a towards the LEDs, and a long wavelength area (red light, green light, or infrared light) of the scattered or absorbed light is reflected from the filter 350a to be re-reflected to the plurality of optical sheets 500a.

Therefore, amounts of red light and green light affecting brightness of light emitted to the plurality of optical sheets 500a increase, and thus total light efficiency may be greatly improved, and color purity and color representation may increase. Also, infrared light affecting a temperature is emitted from the quantum dot member 330a toward the plurality of optical sheets 500a, and thus a surface temperature of the quantum dot member 330a may decrease. Therefore, reliability of the direct type BLU 300a using the quantum dot member 330a that is vulnerable to heat may be improved.

Like the side light type BLU 300, the direct type BLU 300a may have the quantum dot member 330a fixed onto the PCB 310a through a predetermined molding member to be manufactured as a signal package.

According to another exemplary embodiment, a display apparatus may contain both side type and direct type BLUs. Accordingly, this display apparatus may contain quantum dot members and corresponding filters such that both the side and direct LEDs are provided with coverage thereby producing the desired light profile which is then incident unto the remaining portions of the display apparatus.

The foregoing embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A backlight unit (BLU) comprising:
   a plurality of light-emitting diodes (LEDs) configured to emit blue light;
   a light guide panel (LGP);
   a fluorescent member configured to convert the blue light emitted from the plurality of LEDs into tricolor light, and emit the tricolor light; and
   a filter disposed between the fluorescent member and the plurality of LEDs, and configured to selectively filter a first wavelength area of the tricolor light emitted from the fluorescent member toward the plurality of LEDs, and reflect a second wavelength area of the tricolor light emitted from the fluorescent member toward an output direction,
   wherein the fluorescent member is a quantum dot member and,
   wherein the plurality of LEDs are mounted on a printed circuit board (PCB) having high heat conductivity and arranged to operate as a heat sink, and
   wherein the filter has a surface that extends in a direction substantially parallel with a side surface of the LGP, the surface of the filter having a size greater than a size of the side surface of the LGP.

2. The BLU of claim 1, wherein the filter is further configured to transmit a short wavelength of the tricolor light emitted from the fluorescent member toward the plurality of LEDs and reflect a long wavelength of the tricolor light toward the output direction.

3. The BLU of claim 2, wherein the short wavelength comprises a blue light area and an ultraviolet light area, and the long wavelength comprises a red light area, a green light area, and an infrared light area.

4. The BLU of claim 1, wherein the fluorescent member is further configured to maintain a preset optical distance from the plurality of LEDs.

5. The BLU of claim 1, wherein at least a portion of a surface of the filter is attached to a first surface of an adhesive tape, a second surface of the adhesive tape being attached to the PCB.

6. The BLU of claim 1, wherein the BLU is provided in a single package.

7. A liquid crystal display apparatus comprising:
   a liquid crystal panel;
   a plurality of optical sheets configured to be disposed underneath the liquid crystal panel; and
   a plurality of backlight units (BLUs) each comprising:
      a plurality of light-emitting diodes (LEDs) configured to emit blue light,
      a light guide panel (LGP);
      a fluorescent member configured to convert the blue light emitted from the plurality of LEDs into tricolor light, and emit the tricolor light, and
      a filter disposed between the fluorescent member and the plurality of LEDs, and configured to selectively filter a first wavelength area of the tricolor light emitted from the fluorescent member toward the plurality of LEDs, and reflect a second wavelength area of the tricolor light emitted from the fluorescent member toward an output direction,
   wherein the fluorescent member is a quantum dot member,
   wherein the plurality of LEDs are mounted on a printed circuit board (PCB) having high heat conductivity and arranged to operate as a heat sink and
   wherein the filter has a surface that extends in a direction substantially parallel with a side surface of the LGP, the surface of the filter having a size greater than a size of the side surface of the LGP.

8. The liquid crystal display apparatus of claim 7, wherein the filter is further configured to transmit blue light and ultraviolet light of a short wavelength area and reflect red light, green light, and infrared light of a long wavelength area.

9. The liquid crystal display apparatus of claim 7, where the plurality of BLUs are disposed at intervals opposite a lower surface of the liquid crystal panel.

10. The liquid crystal display apparatus of claim 7, further comprising:

a light guide panel (LGP) is disposed underneath the plurality of optical sheets,
wherein the plurality of BLUs are disposed along sides of the LGP.

11. A method of providing light from a backlight unit, the method comprising:
- generating blue light using a light source;
- converting the blue light into a tricolor light using a fluorescent member;
- outputting, from the fluorescent member, the tricolor light that transmits away from the light source;
- reflecting, using a filter, a first wavelength area of the tricolor light that transmits toward the light source; and
- filtering, using the filter, a second wavelength area of the tricolor light that transmits toward the light source so that the second wavelength area of the tricolor light is transmitted and defused back in a direction of the light source,
- wherein the fluorescent member is a quantum dot member,
- wherein the light source is at least one of a plurality of light emitting diodes (LEDs), the plurality of LEDs being mounted on a printed circuit board (PCB) having high heat conductivity and arranged to operate as a heat sink,
- wherein the backlight unit comprises a light guide panel (LGP), and
- wherein the filter has a surface that extends in a direction substantially parallel with a side surface of the LGP, the surface of the filter having a size greater than a size of the side surface of the LGP.

* * * * *